June 21, 1960  G. E. PORTER  2,941,368
COMPOUND MASTER CYLINDER
Filed July 14, 1958
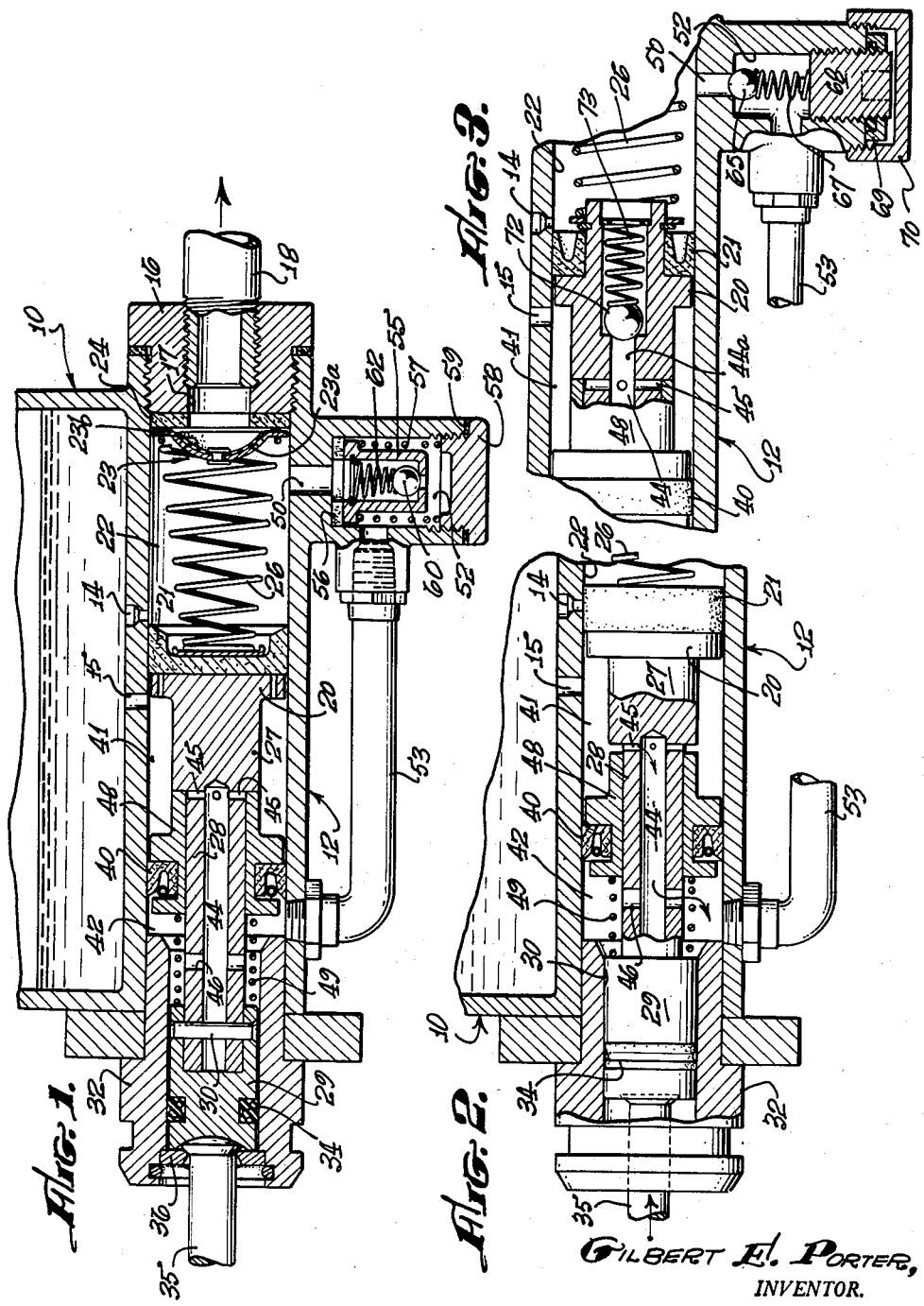
Gilbert E. Porter,
INVENTOR.
BY Knight & Rodgers
ATTORNEYS

United States Patent Office 2,941,368
Patented June 21, 1960

2,941,368

COMPOUND MASTER CYLINDER

Gilbert E. Porter, 125 N. Broadway, Escondido, Calif.

Filed July 14, 1958, Ser. No. 748,291

7 Claims. (Cl. 60—54.6)

The present invention relates generally to hydraulic control or actuating systems; and it is more especially concerned with a hydraulic actuator or power unit as exemplified by the master cylinder in a hydraulic control system for applying vehicle brakes. Since the present invention has been designed primarily as a master cylinder unit suitable for an automobile brake system, it is shown and described in this embodiment as a typical and illustrative example of the invention; but in its broader aspect my invention is not necessarily limited to use in any particular system or with any other specific piece of equipment.

As is well known in the automobile industry, there are many factors which make it desirable to change over from the manual or mechanically controlled brake system to the hydraulically controlled brake system. Briefly stated, it became possible for the vehicle operator to apply a greater effective force at the brakes. Generally speaking, these same factors continue to operate to make it necessary to improve hydraulic control systems.

There is a continuing increase in the size and the weight of automobiles. Larger engines have resulted in an increase in the average speed at which these vehicles are normally operated on city streets. These factors combine to create a corresponding increase in the work which the brakes must do in order to stop a moving vehicle. This is particularly true of commercial vehicles which are generally heavier than passenger vehicles.

The increasing density of traffic in metropolitan areas necessitates more frequent application of the brakes, and in some cases, a longer continuous application of them in order to stop the vehicle. These factors combine to cause increased fatigue on the part of the operator. As a result, various devices have been developed making it possible to apply the brakes more easily and with less physical exertion, thus providing a greater margin of safety in the operation of vehicles, especially by drivers who are women or elderly people not physically as strong as other operators. All of these improvements are directed toward making it possible for the vehicle operator to exert a greater effective force at the brakes of the vehicle as a result of a given effort or force applied to the brake pedal. The result is better control over the vehicle.

One type of specific improvement for this purpose is the compound master cylinder which is designed to have an initial period of relatively low hydraulic pressure followed by a period of relatively high hydraulic pressure during which the vehicle brakes are operative. In some known designs of compound master cylinders, the construction is such that there is a well defined time interval between the high pressure and low pressure stages during application of the brakes. This time lag in developing the high pressure stage is noticeable to the vehicle operator and may give him a feeling of insecurity which is highly undesirable. Furthermore, the condition produces an unnecessarily long range of pedal travel and also prevents as full a degree of control of the brakes as may be desired.

Thus it becomes a general object of my invention to provide a compound master cylinder of novel design.

A further object of my invention is to provide a compound master cylinder in which the transition from the low pressure stage to the high pressure stage is substantially instantaneous and undetectable by the vehicle operator, affording him a maximum degree of control over the vehicle brakes and a sensation of maximum security.

A further object of the invention is to provide a compound master cylinder of simple design that is economical to manufacture and is reliable in service.

These and other objects of my invention are attained in a master cylinder of novel construction that includes the cylinder having a fluid inlet port communicating with a source of fluid, and a fluid outlet port communicating with a suitable delivery conduit. A piston movable axially of the cylinder defines within the forward end of the cylinder a pressure chamber which is in communication with said outlet port through which fluid, under pressure as a result of the forward movement of the piston, is delivered through the conduit to the actuated device, typically a brake-operating cylinder. The piston has a stem connected to it and extending rearwardly therefrom to engage the end of a push rod which is connected to the brake pedal or other manually operated member. A secondary piston is slidably mounted on the stem to engage the cylinder walls and thereby divide the space within the cylinder rearwardly of the piston into two chambers, an intermediate chamber and a rear chamber. The intermediate chamber is in communication with the fluid inlet port in order to receive fluid directly from the supply source.

Fluid passage means is provided extending between the forward pressure chamber and the rear chamber to enable fluid to flow between these two chambers. Associated with this passage means is valve means which is spring biased to a closed position to prevent fluid flow rearwardly out of the pressure chamber until the pressure therein exceeds a predetermined value, and also valve means permitting fluid flow forwardly out of the rear chamber to the forward chamber whenever pressure of the rear chamber exceeds that in the forward chamber.

Means are also provided for introducing fluid into the rear chamber as the piston moves forward, thus keeping the rear chamber full of fluid at all times. In a preferred embodiment of my invention, this means includes a fluid passage through the piston stem which is normally closed by a valve movable in response to movement of the secondary piston. This valve is normally closed but opens in response to differential fluid pressure whenever the fluid pressure in the intermediate chamber is higher than in the rear chamber, thus allowing fluid to flow into the rear chamber.

How the above objects and advantages of my invention, as well as others not specifically mentioned herein, are attained, will be more readily understood by reference to the following description and the annexed drawing in which:

Fig. 1 is a longitudinal median section of a master cylinder constructed according to my invention showing the parts in the normal rest position.

Fig. 2 is a fragmentary longitudinal section showing the piston partially advanced during the low pressure stage.

Fig. 3 is a fragmentary longitudinal median section of a modified form of my invention.

Referring now to the drawing, there is shown in Figs. 1 and 2 a reservoir 10 holding a body of hydraulic fluid and which provides a source of fluid for the system. Below the reservoir and integral therewith is cylinder 12 which is provided with a cylindrical bore extending for the full length of the cylinder. In this instance, the bore is of uniform diameter, but the construction is not necessarily limited thereto. The cylinder is provided with a pair of axially spaced inlet ports 14 and 15 which provide for flow of fluid between the cylinder and the reservoir. The forward end of cylinder 12 is closed by screw plug 16 which has a centrally located bore 17 that forms the outlet port from the cylinder. Port 17 communicates with a conduit 18 by which fluid is delivered from the cylinder to any hydraulically actuated device, not shown in the drawing. In a vehicle braking system, conduit 18 normally leads directly to the brake operating cylinders at the wheels of the vehicle.

Located within cylinder 12 is piston 20 which may be of any suitable design. Piston 20 normally carries at its forward face, cup 21 of any suitable flexible material which provides a fluid tight seal with the inner face of the cylinder bore in order to confine fluid in the cylinder chamber 22 forwardly of the piston as it moves toward the right, as viewed in Fig. 1. Advancing movement of the piston in this direction increases the pressure of the fluid and forces some fluid out through outlet port 17 to conduit 18.

At outlet port 17 there is check valve 23 which may be of any suitable construction. This valve consists of a rigid domed member 23a which is provided with a series of openings covered on one side by a flexible valve member 23b. The annular base flange of member 23a normally rests against resilient seat 24 around port 17. When the pressure at the left of the domed member 23a is greater than that at outlet port 17, fluid pushes the flexible member 24 to one side and flows through the openings in member 23a. Thus as piston 20 advances to the right, fluid flows freely past the valve to outlet port 17. When the pressure is greater at the outlet port side, the flexible valve member 23b is held against the domed member to prevent fluid flow through the openings therein.

Return spring 26 bears at one end against the forward side of piston 20 and at the other end against the base flange of valve 22. When piston 20 is returned by the spring to the normal rest position shown in Fig. 1, the pressure of the spring is sufficient to hold the valve 23 only lightly against seat 24 with the result that the valve maintains a residual pressure in conduit 18 of perhaps 4–5 p.s.i., as is well known in the art. A pressure greater than this is sufficient to cause spring 26 to yield, allowing valve member 23a to lift from seat 24 and thereby allow the fluid to flow in a reverse direction from port 17 back into pressure chamber 22 ahead of piston 20.

When the brakes are fully released, spring 26 returns piston 20 to the position shown in Fig. 1 which is herein termed the rest position. Port 14 is so located with respect to the rest position of the piston that it is slightly forward of the piston and cup 21, thus providing free communication between the reservoir and the pressure chamber 22 under these conditions. Port 14 is a bleeder port, as is well known in the art. It is provided to allow excess fluid from the brake lines to flow back into the reservoir, and also to bleed off any air that may collect in the pressure chamber. Shortly after the beginning of the power stroke, cup 21 closes port 14, cutting off the communication with the reservoir.

Inlet port 15 is spaced axially from port 14 a sufficient distance that, when piston 20 is in the rest position, there is free communication between the reservoir and the cylinder space rearwardly of the piston. Normally port 15 is larger than bleed port 14 as it is the principal inlet for fluid.

Piston 20 is moved forwardly by the piston stem which is attached to and extends rearwardly from the piston. This piston stem has sections of different diameters and for convenience in manufacture and assembly, is preferably made in two or more parts; but it will be realized that the specific details of the construction shown are not limitative upon the present invention. Immediately rearwardly of the piston the stem has a section 27 that is of relatively large diameter. To the rear of stem section 27 is a section 28 of reduced diameter. At the rear end of section 28 is an enlarged section 29 which is connected to section 28 by means of pin 30. Section 29 of the piston stem is of a size to substantially fill the interior of sleeve 32 which fits within the bore of cylinder 12. Stem section 29 is provided with suitable fluid sealing means 34 which engages the inner surface of the bore sleeve 32 to provide a fluid tight seal.

The rear end of stem section 29 is engaged by push rod 35 which is connected to any suitable operating member, as for example the brake pedal of the vehicle. The brake pedal and the linkage connecting it to push rod 35 are well known in the art and since they form no part of the present invention are not shown in the drawing. Rearward movement of the piston stem is limited by stop 36 which is provided with a central opening to receive the end of push rod 35, the stop being designed to engage the enlarged head on push rod 35 to prevent the push rod from being accidentally withdrawn from the cylinder.

There is slidably mounted upon the piston stem, and more especially on stem section 28, a secondary piston 40 which engages the inner wall of the bore cylinder 12 in fluid tight relation and thus divides the cylinder space rearwardly of the piston into two separate chambers. One of these is intermediate chamber 41 which lies between the head of piston 20 and fluid seal 40. The other is rear chamber 42 which is the cylinder space rearwardly of seal 40 and forwardly of the large diameter section 29 of the stem. It will be noted that intermediate chamber 41 communicates with the reservoir through inlet port 15 to admit fluid from the reservoir at all times.

Means is provided for introducing fluid into the rear chamber 42 from chamber 41, such means including a fluid passage 44 within the piston stem. This passage means consists of a longitudinally extended bore 44 having at one end one or more radially extending branches 45 and at the other end one or more radially extended branches 46. Bores 45 and 46 are located at opposite sides of seal 40 and respectively communicate with the intermediate chamber 41 and rear chamber 42.

The secondary piston 40 is slidably mounted on the reduced diameter portion 28 of the piston stem and is integral with sleeve 48 which slides on the stem. The piston and sleeve are normally urged forward to the position of Fig. 1 by coil spring 49 which surrounds the stem section 28 and is located in rear chamber 42. This spring bears at one end against piston 40 and at the other end against a suitable fixed abutment, such as the forward end of enlarged stem section 29. Forward movement of sleeve 48 is limited by its engagement with the rearwardly facing shoulder formed at the rear end of the larger piston stem section 27 by the adjoining section of smaller diameter. In this forward position, sleeve 48 closes passages 45 shutting off communication between chambers 41 and 42. When sleeve 48 is moved rearwardly from this position, as will be explained later, it uncovers ports 45, thus establishing communication between the two chambers 41 and 42 by way of the fluid passage 44 in the piston stem.

There is provided another fluid passage means enabling fluid flow between pressure chamber 22 and rear chamber 42. The passage means includes passage 50 extending between chamber 22 and valve chamber 52, and conduit 53 connecting valve chamber 52 with rear chamber 42. Fluid flow through the passage is controlled by a double check valve mechanism shown in Fig. 1. One normally closed valve means prevents fluid flow rearwardly out of pressure chamber 22 until the pressure therein exceeds a predetermined value to open the valve; and a second normally closed valve permits fluid flow forwardly out of the rear chamber whenever the pressure therein exceeds the pressure of the fluid in pressure chamber 22.

Referring particularly to Fig. 1, it will be seen that one valve means comprises a sleeve-like valve member 55 having a base flange which bears against an annular sealing member 56 that is preferably made of resilient material that permits a fluid tight seal between the member 56 and the flange of valve member 55. The flange of the valve member is normally urged into sealing engagement with member 56 by compression spring 57 which at its upper end bears against the flange and at its lower end against screw cap 58 which closes one end of valve chamber 52. Screw cap 58 provides a means for adjusting the pressure exerted by spring 57 against valve member 55. This may be done either by replacing the cap with one that is longer or shorter to compress or expand respectively, spring 57, or by changing the thickness of the sealing gasket 59 under the head of the screw cap. The thickness of this gasket determines the distance which a cap of given size penetrates into chamber 52 and thus the compression of spring 57. Other means of adjustably compressing spring 57 will be evident to those skilled in the art.

To provide the other valve means, the lower end of valve member 55 has an opening of smaller diameter than the internal bore of the sleeve-like member and this opening provides a seat for ball 60 which acts as a check valve to prevent flow in one direction through the sleeve. Ball 60 is normally urged downwardly into contact with this opening in the end of the sleeve by compression spring 62 which at one end bears against ball valve member 60 and at the other end against a fixed abutment within sleeve 55. Spring 62 is a very light spring since its only purpose is to hold the ball in position to check fluid flow from chamber 22 through the opening it closes whereas spring 57 is a much heavier spring designed to hold the valve which it controls closed until a substantial pressure differential is built up.

Having described a preferred embodiment of my invention, I will now describe its method of operation. When the brakes are fully released, all of the parts occupy the position shown in Fig. 1. Chambers 22, 41 and 42 are completely filled with hydraulic fluid, chambers 22 and 41 normally being in communication with reservoir 12 through ports 14 and 15 respectively. Valve 23 is closed, and, because of the pressure of return spring 26, maintains a small pressure on the hydraulic fluid in the conduit 18 and the brake cylinders, as is usual practice in the art. Valves 55 and 60 are likewise closed, because of being biased to these closed positions by springs 57 and 62 respectively.

As the brakes are applied by movement of push rod 35, the entire piston and stem assembly moves to the right within cylinder 12. There is no appreciable increase in fluid pressure within chamber 22 until cup 21 has passed port 14, after which the chamber is closed and further movement of piston 20 builds up the fluid pressure within chamber 22. As the pressure builds up, valve 55 remains closed during the initial period, but flexible member 24 yields to the pressure differential, allowing fluid to flow out of the pressure chamber through outlet port 17 into conduit 18. Fluid pressure continues to build up in chamber 22 and fluid flows out of the chamber into and through conduit 18 during the initial or low pressure stage, which may be considered to continue until the brake shoes are expanded into contact with the brake drums.

During this initial stage, intermediate chamber 41 continues to remain in free communication with the reservoir and is filled with fluid. Communication between rear chamber 42 and pressure chamber 22 is shut off by the valve means controlling fluid flow since both valves 55 and 60 remain closed. Spring 49 urges sleeve 48 to the right.

As a consequence of these conditions, the forward movement of piston 20 tends to expand chamber 42 and develop a sub-atmospheric pressure in rear chamber 42. During this first movement of the piston, the pressure of spring 49 urges secondary piston 40 to move along with the main piston, but the fluid within the chamber is inelastic and no added fluid can be introduced into chamber 42 with the result that a decrease in fluid pressure tends to develop within the chamber. At the same time the fluid pressure in chamber 41 on the forward face of seal 40 remains substantially atmospheric, and quickly becomes great enough to slightly compress spring 49. As a result the fluid pressure differential across piston 40 thus created causes the secondary piston and sleeve 48 to move rearwardly with respect to piston stem section 28 and uncover ports 45 as shown in Fig. 2. When ports 45 open, there is free communication established through ports 45, passage 44 and ports 46 between intermediate chamber 41 and rear chamber 42. The greater fluid pressure in the intermediate chamber now causes fluid flow to the rear into chamber 42 to an extent sufficient to keep chamber 42 completely filled with hydraulic fluid. At any time that the fluid pressure in the two chambers becomes equalized, the force of spring 49 causes the sleeve to advance forwardly, carrying with it seal 40, to close ports 45.

As soon as the pressure within the chamber 22 reaches approximately 125 p.s.i., or any other predetermined pressure, valve 55 opens. Fluid pressure is now sufficient to cause spring 57 to yield. The exact value of the fluid pressure at which this valve opens is controlled, as previously explained, by the force exerted by spring 57 against the base flange on valve 55; and by controlling this force, the valve can be designed to open at any desired fluid pressure. According to current practice in the industry, this fluid pressure is about 125 p.s.i. or slightly higher.

When valve 55 opens, fluid is exhausted from chamber 22 not only through outlet port 17 but also through the fluid passage means defined by passages 50 and 53 and valve chamber 52, the fluid flowing through this latter passage means going into rear chamber 42. As a result, the fluid pressure within rear chamber 42 immediately rises to a value substantially above atmospheric with the result that the pressure on the rear side of secondary piston 40 combines with spring 49 to cause sleeve 48 to move forwardly if it has not already done so, closing ports 45. Closing ports 45 shuts off fluid communication and flow between chambers 41 and 42, thus retaining the high pressure in the rear chamber 42.

Operation of the master cylinder has now entered the second or high pressure stage of operation. Physically, this is distinguished from the low pressure stage by flow of fluid from pressure chamber 22 into rear chamber 42. This means that for a given forward travel of piston 20, displacing a given volume of fluid, only a portion of that volume fluid is exhausted through port 17 and conduit 18 to the brakes. The result is a mechanical advantage gained over the movement of the piston during the low pressure stage. The volume of hydraulic fluid exhausted to chamber 42 depends upon the increase in volume of that chamber for a given advance movement of the piston. It will be seen that the total volume of fluid displaced from chamber 22 and the net volume of fluid exhausted through port 17 (equal to the total displaced less the fluid transferred to chamber 42) are functions of the relative diameters of piston 20 and section 28 of the piston stem, the two volumes being respectively proportional to the squares of these diameters. Hence the mechanical advantage gained by this arrangement is numerically equal to the diameter of stem 28 over the diameter of piston 20. It decreases with an increase in diameter of section 28 and increases with a decrease in the diameter of that section of the stem. As a result of this mechanical advantage, it is possible for the vehicle operator to develop a greater maximum unit pressure in the fluid within chamber 22 for a given thrust applied by push rod 35, than it would be without this mechanical advantage. It is easily possible and satisfactory for most installations to operate with an advantage of approximately 2:1.

When the brakes are released after being applied, the return movement of piston 20 to the left as viewed in Fig. 1 reduces the volume of chamber 42. Hydraulic fluid is exhausted from this chamber and returned to chamber 22 by the passage means consisting of conduit 53, chamber 52 and passage 50. This return movement of the piston is accomplished by the force exerted by return spring 26 which moves the piston to the left and expands chamber 22. At the same time a reverse flow of hydraulic fluid takes place from the brake cylinders through conduit 18, and into chamber 22 through port 17. The flow into chamber 22 is here made possible by valve 23 unseating to allow the reverse movement of fluid. In a similar manner, valve 60 unseats in response to the relatively higher fluid pressure in chamber 42, thus allowing a free flow of fluid into the pressure chamber 22. As the piston cup clears port 14, fluid can flow back into the reservoir. During this movement, sleeve 48 closes ports 45 at all times. At the end of the reverse stroke the parts return to the rest position of Fig. 1.

In the form of the invention shown in Figs. 1 and 2, a single fluid passage means is provided for flow in both directions between chambers 22 and 42. Fluid flow is controlled by two valve means incorporated in a single mechanism. However, it is possible to divide the passage means in such a way that flow is in one direction only through each of two separate portions of the passage means, each portion thereof being controlled by a separate valve. Such an arrangement is shown in the modification of my invention shown in Fig. 3 which is otherwise constructed as previously described.

In Fig. 3, the valve structure in chamber 52 has been modified to limit it to ball 65 seating at one end of passage 50 under the influence of compression spring 67. Spring 67 vears at one end against the ball and at the other end against the threaded plug 68 which is screwed into one end of chamber 52 in order to close the chamber and provide an abutment for spring 67. A lock nut 69 engages the external threads on plug 68 and can be tightened against the cylinder body to hold plug 68 in any adjusted position to obtain the desired compression of spring 67. A protective cap 70 covers the lock nut and plug.

The structure of this valve means is such as to permit fluid flow only in the rearward direction from the pressure chamber to the rear chamber when the pressure in the chamber 22 reaches the predetermined level of 125 p.s.i., or other value as established. Thus valve 65 corresponds in function to valve 55 of Fig. 1.

In order to provide for return flow of fluid from the rear chamber to the forward pressure chamber, the fluid passage 44 within the piston stem is extended forwardly at 44a to open at the front end of the piston to chamber 22. The extension 44a of this passage forwardly of ports 45 permits fluid to flow by way of ports 46 and passage 44 through extension 44a into the forward pressure chamber. Reverse flow is prevented by check valve 72 which is biased by spring 73 to a normal position closing passage 44a against rearward flow from chamber 22. The check valve functions in the same manner as valve 60 in the form of the invention described in connection with Fig. 1. Passage 44 and the ports 45 and 46 perform the same functions as already described; but in addition the passage 44 and ports 46 are part of passage means permitting fluid flow between the rear chamber and the forward pressure chamber.

The changes in structure shown in Fig. 3 involve no changes in operation and as a result the operation of this form of my invention is the same as already described.

Various changes in the details of construction and arrangement of the various parts of my improved master cylinder construction may occur to those skilled in the art without departing from the spirit and scope of my invention. Accordingly it is to be understood that the foregoing description is considered to be illustrative of rather than limitative upon the invention as defined by the appended claims.

I claim:

1. In a master cylinder construction, the combination comprising:

a cylinder having fluid inlet and outlet means;

a piston within and movable axially of the cylinder and defining within the cylinder a pressure chamber forwardly of the piston;

an operating stem on the piston and extending rearwardly therefrom;

a secondary piston slidably mounted on the stem and slidably engaging the cylinder walls for dividing the cylinder space rearwardly of the piston into a rear chamber and an intermediate chamber; and passage means for fluid flow between the pressure chamber and the rear chamber, including valve means preventing fluid flow rearwardly out of the pressure chamber until the pressure therein exceeds a predetermined value, and valve means permitting fluid flow forwardly out of the rear chamber when fluid pressure therein exceeds that in the pressure chamber.

2. A master cylinder construction as in claim 1 which also includes means introducing fluid from the intermediate chamber into the rear chamber as the piston initially moves forward.

3. A master cylinder construction as in claim 2 that also includes valve means associated with the last mentioned means permitting fluid flow only rearwardly from the intermediate chamber into the rear chamber.

4. In a master cylinder construction, the combination comprising:

a cylinder having fluid inlet means in communication with a fluid reservoir and a fluid outlet port for communication with a fluid actuated device;

a piston within and movable axially of the cylinder and defining within the cylinder a pressure chamber forwardly of the piston, said pressure chamber communicating with said outlet port;

an operating stem on the piston and extending rearwardly therefrom;

a secondary piston slidably mounted on the stem and slidably engaging the cylinder wall for dividing the cylinder space rearwardly of the piston into a rear chamber and an intermediate chamber communicating with said fluid reservoir;

first fluid pasage means for fluid flow between the pressure chamber and the rear chamber, and including valve means preventing fluid flow rearwardly out of the pressure chamber to the rear chamber until the pressure in the pressure chamber exceeds a predetermined value, and valve means permitting fluid flow forwardly out of the rear chamber to the pressure chamber when pressure in the rear chamber exceeds that in the pressure chamber; and second fluid passage means for fluid flow between the intermediate chamber and the rear chamber, and means controlling fluid flow in the sceond passage means in response to movement of the secondary piston responsive to differential fluid pressures in the rear and intermediate chambers.

5. A master cylinder construction as in claim 4 in which the second fluid passage means includes a fluid passage in the piston stem and the flow controlling means comprises a sleeve slidably mounted on the stem.

6. A master cyinder as in claim 4 that also includes means for adjusting the predetermined pressure at which the valve means at the first passage means permits fluid flow rearwardly from the pressure chamber.

7. A master cylinder construction comprising:

a cylinder having a first fluid inlet port in communication with a fluid reservoir and a fluid outlet port for communication with a fluid actuated device;

a piston within and movable axially of the cylinder and defining within the cylinder a pressure chamber forwardly of the piston, said pressure chamber communicating with said outlet port;

an operating stem on the piston extending rearwardly therefrom;

a secondary piston slidably mounted on the stem and slidably engaging the cylinder walls for dividing the cylinder space rearwardly of the piston into a rear chamber and an intermediate chamber communicating with said reservoir through a second inlet port;

first fluid passage extending between the pressure chamber and the rear chamber; first valve means biased to a position closing said passage to fluid flow and opening in response to fluid pressure in the pressure chamber in excess of a predetermined value to permit flow from the pressure chamber to the rear chamber;

second fluid passage in the piston stem extending between the pressure chamber and the rear chamber;

second valve means biased to a normal position closing the second passage to fluid flow and opening in response to fluid pressure in the rear chamber when in excess of the fluid pressure in the pressure chamber to permit return of fluid to the pressure chamber;

a third fluid passage in the piston stem extending between the intermediate chamber and the second fluid passage;

and third valve means controlling communication between the intermediate chamber and the second passage in response to movement of the secondary piston responsive to differential fluid pressure in the rear and intermediate chambers.

References Cited in the file of this patent

UNITED STATES PATENTS

| | | |
|---|---|---|
| 2,340,113 | Dodge | Jan. 25, 1944 |
| 2,507,663 | Dodge | May 16, 1950 |